United States Patent
Kakuya et al.

(10) Patent No.: US 7,848,869 B2
(45) Date of Patent: Dec. 7, 2010

(54) CONTROLLER OF INTERNAL COMBUSTION ENGINE OF COMPRESSION IGNITION COMBUSTION TYPE

(75) Inventors: Hiromu Kakuya, Hitachinaka (JP); Kengo Kumano, Hitachi (JP); Shiro Yamaoka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 414 days.

(21) Appl. No.: 11/954,417

(22) Filed: Dec. 12, 2007

(65) Prior Publication Data

US 2008/0147300 A1 Jun. 19, 2008

(30) Foreign Application Priority Data

Dec. 18, 2006 (JP) ............................. 2006-339385

(51) Int. Cl.
*G06F 7/00* (2006.01)
*F02B 17/00* (2006.01)

(52) U.S. Cl. .................. 701/103; 701/108; 123/295

(58) Field of Classification Search ............. 123/305, 123/27 R, 431, 295, 299, 300; 701/101, 701/102, 103, 104, 105, 108
See application file for complete search history.

(56) References Cited

U.S. PATENT DOCUMENTS

| 6,752,104 B2 * | 6/2004 | Fiveland et al. ........... 123/27 R |
| 7,240,659 B2 * | 7/2007 | Yang ........................... 123/295 |
| 2004/0182359 A1 * | 9/2004 | Stewart et al. .............. 123/295 |

FOREIGN PATENT DOCUMENTS

| JP | 2000-192828 | * | 12/1998 |
| JP | 2000-192828 A | | 7/2000 |
| JP | 2000-220458 | | 8/2000 |
| JP | 2001-003800 | | 1/2001 |
| JP | 2003-500592 A | | 1/2003 |
| JP | 2004-293471 | * | 10/2004 |
| JP | 2004-293471 A | | 10/2004 |
| JP | 2005-291065 A | | 10/2005 |
| JP | 2006-233839 | * | 9/2006 |
| JP | 2006-233839 A | | 9/2006 |

OTHER PUBLICATIONS

Japanese Office Action dated Sep. 1, 2009 (Four (4) pages).
Japanese Office Action mailed Apr. 28, 2009 and English translation thereof.

* cited by examiner

*Primary Examiner*—Stephen K Cronin
*Assistant Examiner*—Raza Najmuddin
(74) *Attorney, Agent, or Firm*—Crowell & Moring LLP

(57) ABSTRACT

A controller of an internal combustion engine capable of spark ignition combustion and compression ignition combustion which restrains the degradation of operation performance and exhaust performance at the time of combustion type switching. The controller includes control means for performing combined combustion which leads to ignition combustion by a pressure rise by spark ignition combustion through adjustment of an internal cylinder temperature and a combustion speed at the end of compression, wherein the combined combustion is performed in the process of combustion type switching between spark ignition combustion and compression ignition combustion based on a result of determination of whether or not combustion type switching is possible, thus implementing a smooth combustion type switching.

10 Claims, 11 Drawing Sheets

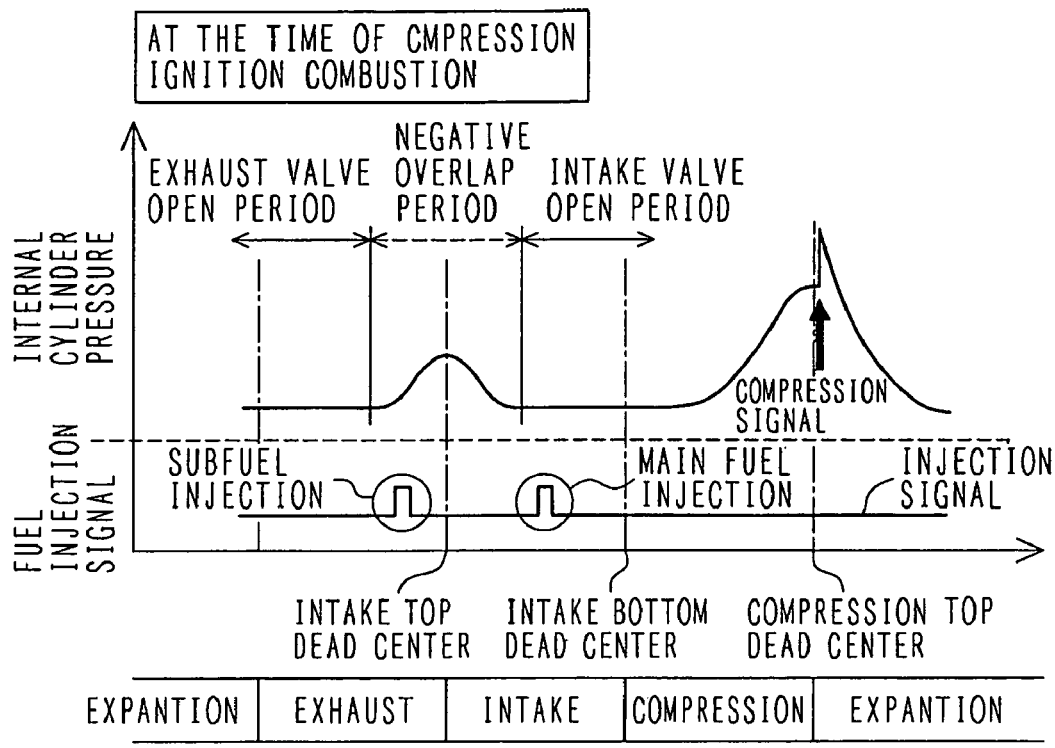
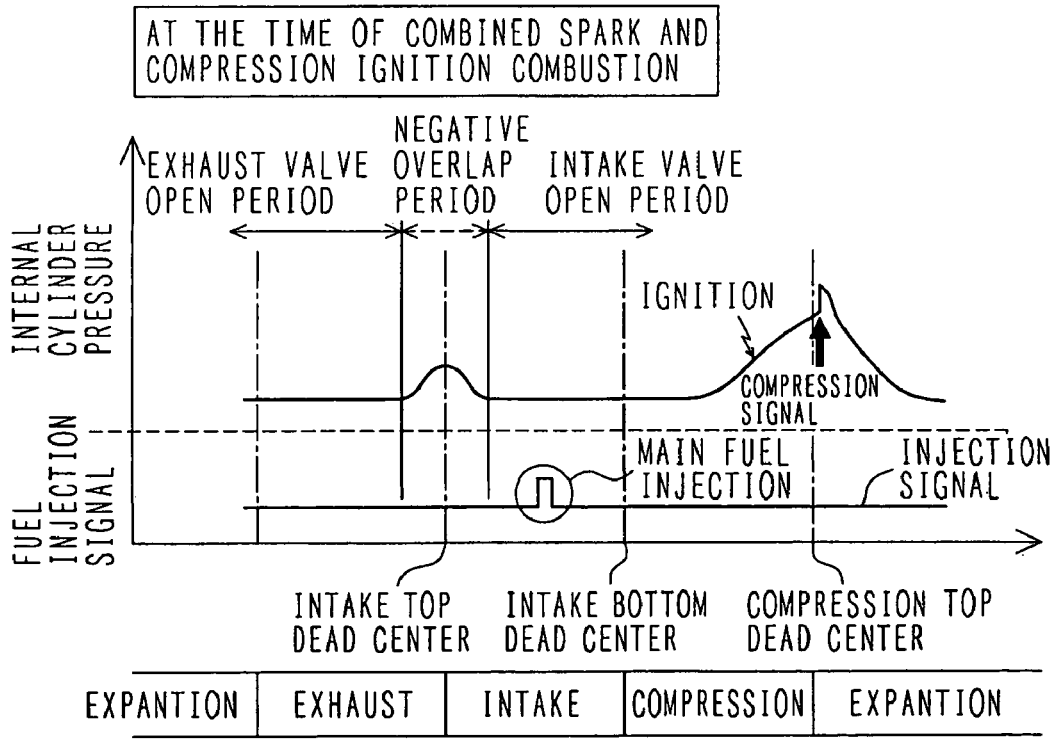

US 7,848,869 B2

CONTROLLER OF INTERNAL COMBUSTION ENGINE OF COMPRESSION IGNITION COMBUSTION TYPE

CLAIM OF PRIORITY

The present application claims priority from Japanese Application No. 2006-339385, filed in Japan on Dec. 18, 2006, the content of which is hereby incorporated by reference into this application.

BACKGROUND OF THE INVENTION

1. Field of the Invention

The present invention relates to a controller of an internal combustion engine capable of switching a combustion type between spark ignition combustion and compression ignition combustion.

2. Description of the Related Art

As an internal combustion engine (hereafter referred to as engine) used for automobiles, etc., providing both improved fuel efficiency and improved exhaust performance, a compression ignition gasoline engine (hereafter referred to as compression ignition engine) which compresses an air-fuel mixture and performs ignition combustion (hereafter referred to as compression ignition combustion) is attracting attention. In comparison with spark ignition combustion in which an air-fuel mixture is ignited with sparks of an ignition plug, the compression ignition engine reduces the fuel consumption through improved efficiency by high compression, reduced pump loss, and reduced cooling loss by rapid combustion. The compression ignition engine also reduces the NOx concentration in exhaust gas through low-temperature combustion of the air-fuel mixture thus satisfying both the fuel efficiency performance and the exhaust performance.

For the application of the compression ignition engine to an automobile, it is proposed that both spark ignition combustion and compression ignition combustion be performed and the combustion type be switched therebetween to attain an engine torque required by a driver.

A technique for switching the combustion type between spark ignition combustion and compression ignition combustion is disclosed in JP-A-2004-293471. JP-A-2004-293471 discloses a technique which provides an operating region (hereafter referred to as intermediate compression ignition combustion region) in which intermediate compression ignition combustion is performed. In this region, torque fluctuations caused by variation of air volume and pump loss, etc. at the time of combustion type switching between spark ignition combustion and compression ignition combustion are reduced by setting a throttle opening to a setup value 3 that is a middle between a setup value 1 at the time of spark ignition combustion and a setup value 2 at the time of compression ignition combustion.

SUMMARY OF THE INVENTION

Upon switching the combustion type between spark ignition combustion and compression ignition combustion, it is necessary to change preset engine parameters to setup values suitable for each combustion type in order to implement two combustion types. In this case, an operating range of engine parameters between the two combustion types is wide. In control for simply switching engine parameters (hereafter referred to as simple switch control), therefore, engine parameters have limited response characteristics; accordingly, there exists a cycle in which the internal cylinder condition (combustion chamber condition) is not suitable for implementing spark ignition combustion or compression ignition combustion. This prevents a smooth switching between the two combustion types, resulting in a problem that torque fluctuations increase by degraded combustion stability and spark failure.

An object of the present invention is to provide a controller of an internal combustion engine capable of smoothly switching the combustion type between spark ignition combustion and compression ignition combustion.

A controller of an internal combustion engine that performs combined spark and compression ignition combustion (hereafter referred to as combined combustion) in which compression ignition combustion is performed by a pressure rise after spark ignition combustion.

In accordance with the present invention, a smooth switching between the two combustion types, spark ignition combustion and compression ignition combustion, is enabled.

BRIEF DESCRIPTION OF THE DRAWINGS

FIG. 4 is a diagram showing a pressure profile and fuel injection timing in one cycle at the time of compression ignition combustion by a controller of an internal combustion engine according to an embodiment of the present invention.

FIG. 5 is a diagram showing a pressure profile and fuel injection timing in one cycle at the time of combined combustion by a controller of an internal combustion engine according to an embodiment of the present invention.

DETAILED DESCRIPTION OF THE PREFERRED EMBODIMENTS

Figure 1:
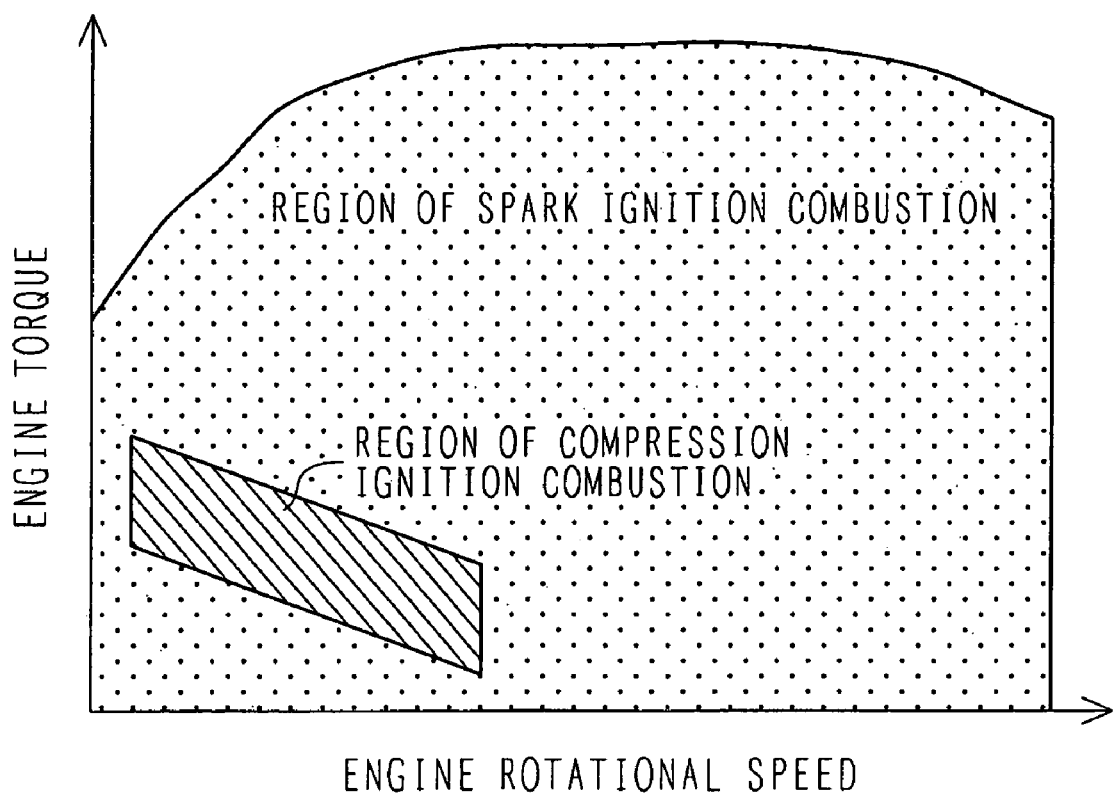
FIG. 1 is a diagram showing an operating region for each of spark ignition combustion and compression ignition combustion and regions which enable switching therebetween.

Of methods of performing compression ignition combustion such as heating of intake air, an increase in compression rate, introduction of internal EGR, etc., the introduction of internal EGR by operation of valve timing is a highly feasible method of compression ignition combustion in light of costs involved and operation with spark ignition combustion. At the time of compression ignition combustion by the introduction of internal EGR, it is necessary to increase the amount of internal EGR in the combustion chamber. Since the above method limits the fresh air volume flowing into the cylinder and since a finite time is required for chemical reactions from forming of an air-fuel mixture to combustion, a naturally-aspirated engine can implement compression ignition combustion under low-load low-rotational-speed operating conditions, as shown in FIG. 1.

An embodiment of the present invention will be explained below with reference to the accompanying drawings.

Figure 2:
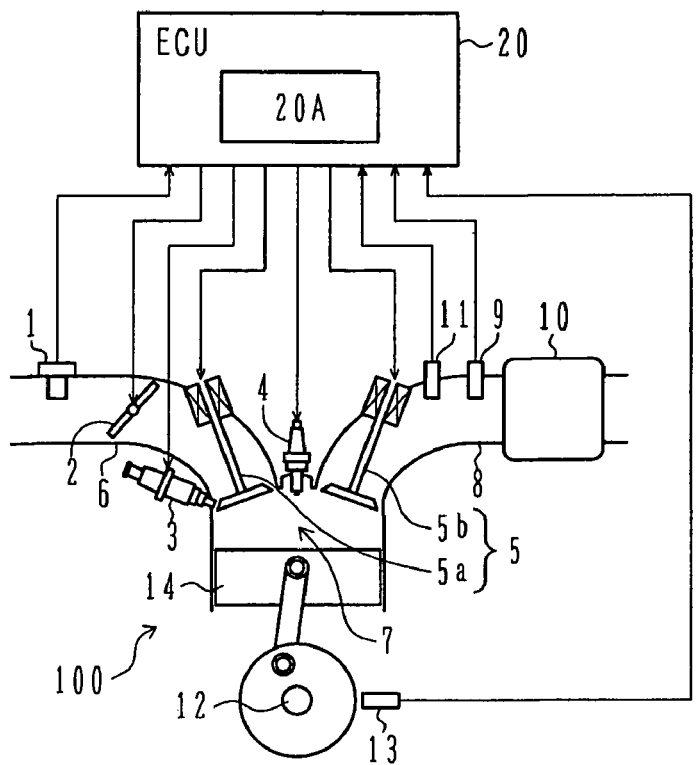
FIG. 2 is a system configuration when a controller of an internal combustion engine according to an embodiment of the present invention is applied to a direct injection engine.

FIG. 2 is a system configuration when a controller of a compression ignition combustion engine according to an embodiment of the present invention is applied to an automobile gasoline engine.

An engine 100 is a compression ignition engine that performs spark ignition combustion and compression ignition combustion. The engine 100 includes an airflow sensor 1 which measures the amount of intake air and an electronic control throttle 2 which adjusts the intake flow rate, each being provided at a required position in an intake pipe 6. Further, the engine 100 includes an injector 3 which injects fuel into a combustion chamber surrounded by a cylinder 7 and a piston 14, an ignition plug 4 which supplies ignition energy, and variable valves 5 (an intake valve 5a which controls intake gas flowing in the cylinder and an exhaust valve 5b which controls exhaust gas discharged therefrom); each being provided at a required position in the cylinder 7. The amount of EGR in the cylinder is controlled by controlling the variable valves 5. Further, the engine 100 includes a three-way catalyst 10 which purifies exhaust gas, an air-fuel ratio sensor 9 which is one mode of an air-fuel ratio detector and detects an air-fuel ratio of exhaust gas on an upstream side of the three-way catalyst 10, and an exhaust temperature sensor 11 which is one mode of an exhaust temperature detector and measures the temperature of exhaust gas on an upstream side of the three-way catalyst 10; each being provided at a required position in the exhaust pipe 8. Further, a crankshaft 12 is provided with a crank angle sensor 13 for calculating the rotational angle. Signals obtained from the airflow sensor 1, the air-fuel ratio sensor 9, the exhaust temperature sensor 11, and the crank angle sensor 13 are sent to a control unit (hereafter referred to as ECU 20). Further, a signal (not shown in the diagram) obtained from a sensor which detects a requested torque for the engine (hereafter referred to as requested torque detection sensor) is sent to the ECU 20, and a requested torque is calculated based on an output signal of the requested torque detection sensor within the ECU 20. The requested torque detection sensor refers to an accelerator opening sensor, for example, in an engine-mounted automobile. Further, the ECU 20 calculates the rotational speed of the engine based on an output signal of the crank angle sensor 13. Based on engine operating conditions obtained from outputs of each of the above-mentioned sensors, main operation variables of the engine such as airflow rate, amount of fuel injection, ignition timing, etc. are optimally calculated.

The amount of fuel injection calculated by the ECU 20 is converted to a valve opening pulse signal and then sent to the injector 3. Further, an ignition plug drive signal is sent to the ignition plug 4 so that the fuel can be ignited at an ignition timing calculated by the ECU 20. Further, a throttle opening calculated by the ECU 20 is sent to the electronic control throttle 2 as a throttle drive signal. Further, the operation amounts of the variable valves calculated by the ECU 20 are sent to the variable valves 5 as variable valve drive signals.

Figure 3:
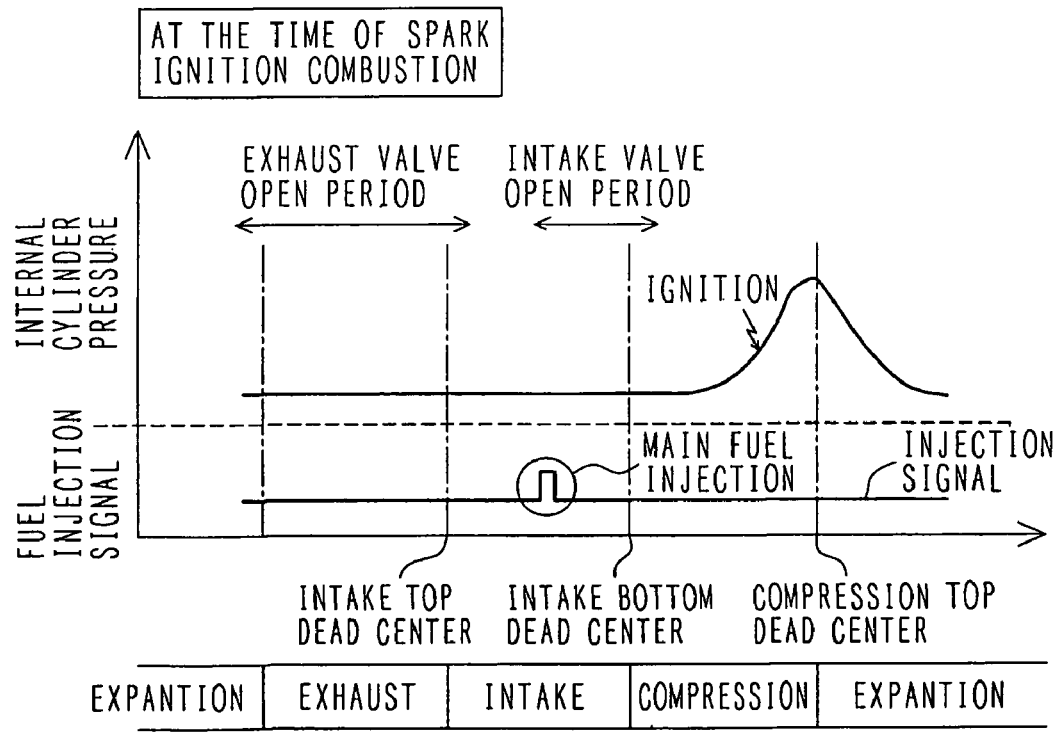
FIG. 3 is a diagram showing a pressure profile and fuel injection timing in one cycle at the time of spark ignition combustion by a controller of an internal combustion engine according to an embodiment of the present invention.

Upon performing spark ignition combustion, fuel is injected (main fuel injection) to the air that has flowed into the cylinder 7 through the intake valve 5a from the intake pipe 6, thus forming an air-fuel mixture. The air-fuel mixture explodes by sparks generated by the ignition plug 4 at a predetermined ignition timing. The combustion pressure of the explosion depresses the piston to produce a driving force of the engine. Further, exhaust gas after the explosion is sent to the three-way catalyst 10 through the exhaust pipe 8, and exhaust gas components are purified in the three-way catalyst 10 and then discharged to the outside. An operation of the engine 100 at the time of spark ignition combustion is outlined in FIG. 3.

When performing compression ignition combustion, a negative overlap period with the variable valves 5 (intake valve 5a and exhaust valve 5b) closed is provided during the exhaust stroke to leave internal EGR in the cylinder 7. Then, fuel is injected (subfuel injection) from the injector 3 during this period, thus improving the fuel quality and generating an ignition agent. Further, air flows into the cylinder 7 through the intake valve 5a from the intake pipe 6 during the intake stroke, and fuel injection (main fuel injection) is performed again to form an air-fuel mixture which explodes by compression of the piston. The combustion pressure of the explosion depresses the piston to produce a driving force of the engine. Subsequently, in a manner similar to spark ignition combustion, exhaust gas is purified by the three-way catalyst 10 and then discharged to the outside. An operation of the engine 100 at the time of compression ignition combustion is outlined in FIG. 4.

Further, the ECU 20 also performs combustion of a type different from spark ignition combustion and compression ignition combustion. When implementing this combustion, a negative overlap period is provided to leave internal EGR in the cylinder 7. However, the amount of residual EGR is less than that at the time of compression ignition combustion. During the intake stroke, air is channeled into the cylinder 7 through the variable valves 5 from the intake pipe 6, and fuel injection (main fuel injection) is performed to form an air-fuel mixture. During the compression stroke, the air-fuel mixture explodes by sparks generated by the ignition plug 4 at a predetermined ignition timing. However, because of a pressure rise by the explosion and an effect of the introduction of internal EGR, a part of the air-fuel mixture not having undergone spark ignition combustion performs compression ignition resulting in an explosion. The combustion pressure of the explosion depresses the piston to produce a driving power of the engine. Subsequently, in a manner similar to spark ignition combustion, exhaust gas is purified by the three-way catalyst 10 and then discharged to the outside. Such combustion that implements ignition combustion by a pressure rise after the above-mentioned spark ignition combustion is defined as combined combustion. An operation of the engine 100 at the time of the combined combustion is outlined in FIG. 5.

By providing a period for performing the combined combustion in the process of combustion type switching between spark ignition combustion and compression ignition combustion by use of a controller capable of the combined combustion which implements ignition combustion by a pressure rise after spark ignition combustion, it becomes possible to reduce the number of cycles in which the internal cylinder condition causes unstable combustion at the time of engine parameter operation, enabling a smooth transition of the combustion type. Thus, torque fluctuations at the time of combustion type switching can be suppressed to ensure operation performance. Further, by maintaining the air-fuel ratio to the stoichiometric condition even during execution of the combined combustion, exhaust gas components in the combined combustion can be purified by the three-way catalyst on a downstream side of the exhaust pipe, thus restraining the degradation of the exhaust performance at the time of combustion type switching.

Figure 6:
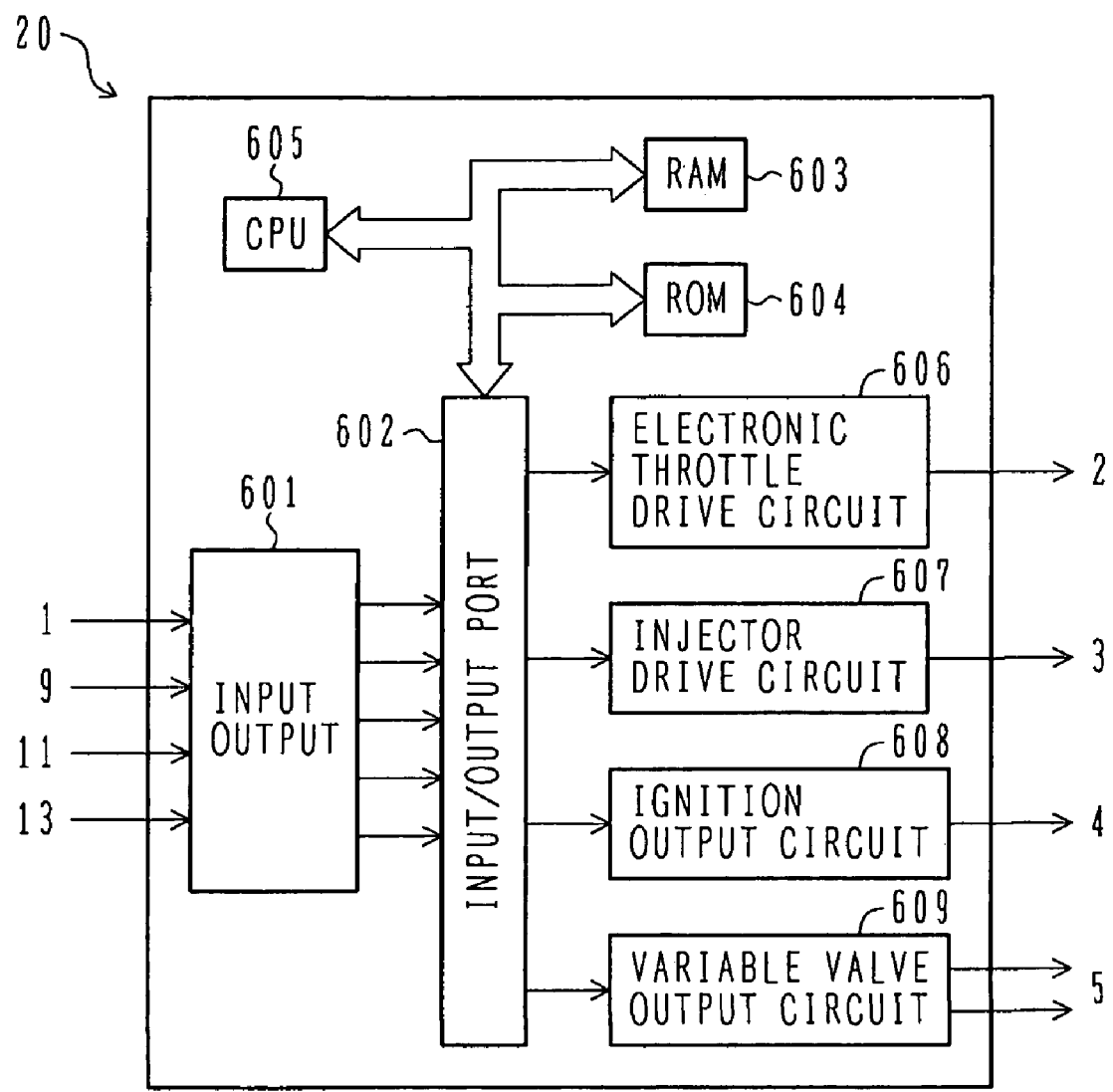
FIG. 6 is an internal block diagram of an ECU according to an embodiment of the present invention.

FIG. 6 shows an internal block diagram of the ECU 20. In the ECU 20, output signals of the airflow sensor 1, the air-fuel ratio sensor 9, the exhaust temperature sensor 11, and the crank angle sensor 13 are inputted to an input circuit 601. However, input signals are not limited thereto. The inputted input signals of each sensor are sent to an input port in an input/output port 602. Values sent to the input port are stored in a RAM 603 and then subjected to calculation processing by a CPU 605. A control program having descriptions of detailed calculation processing is programmed in a ROM 604 in advance. A value indicating an amount of operation of each actuator calculated according to the control program is stored in the RAM 603, sent to the output port in the input/output port 602, and sent to each actuator through each drive circuit. Drive circuits of the present embodiment include an electronic throttle drive circuit 606, an injector drive circuit 607, an ignition output circuit 608, and a variable valve drive circuit 609. These circuits control the actuation of the electronic control throttle 2, the injector 3, the ignition plug 4, and the variable valves 5, respectively.

The ECU 20 is provided with a combustion type switching controller 20A which prevents the degradation of operation performance and exhaust performance at the time of combustion type switching between spark ignition combustion and compression ignition combustion. The following explains the combustion type switching control between spark ignition combustion and compression ignition combustion by the combustion type switching controller 20A. In particular, the combustion type switching controller 20A according to the present embodiment performs the combined combustion by controlling an internal cylinder temperature and a combustion speed at the end of compression upon combustion type switching, thus performing a smooth switching between spark ignition combustion and compression ignition combustion. As a result, it is possible to reduce torque fluctuations and an increase in exhaust gas components at the time of combustion type switching.

Figure 7:
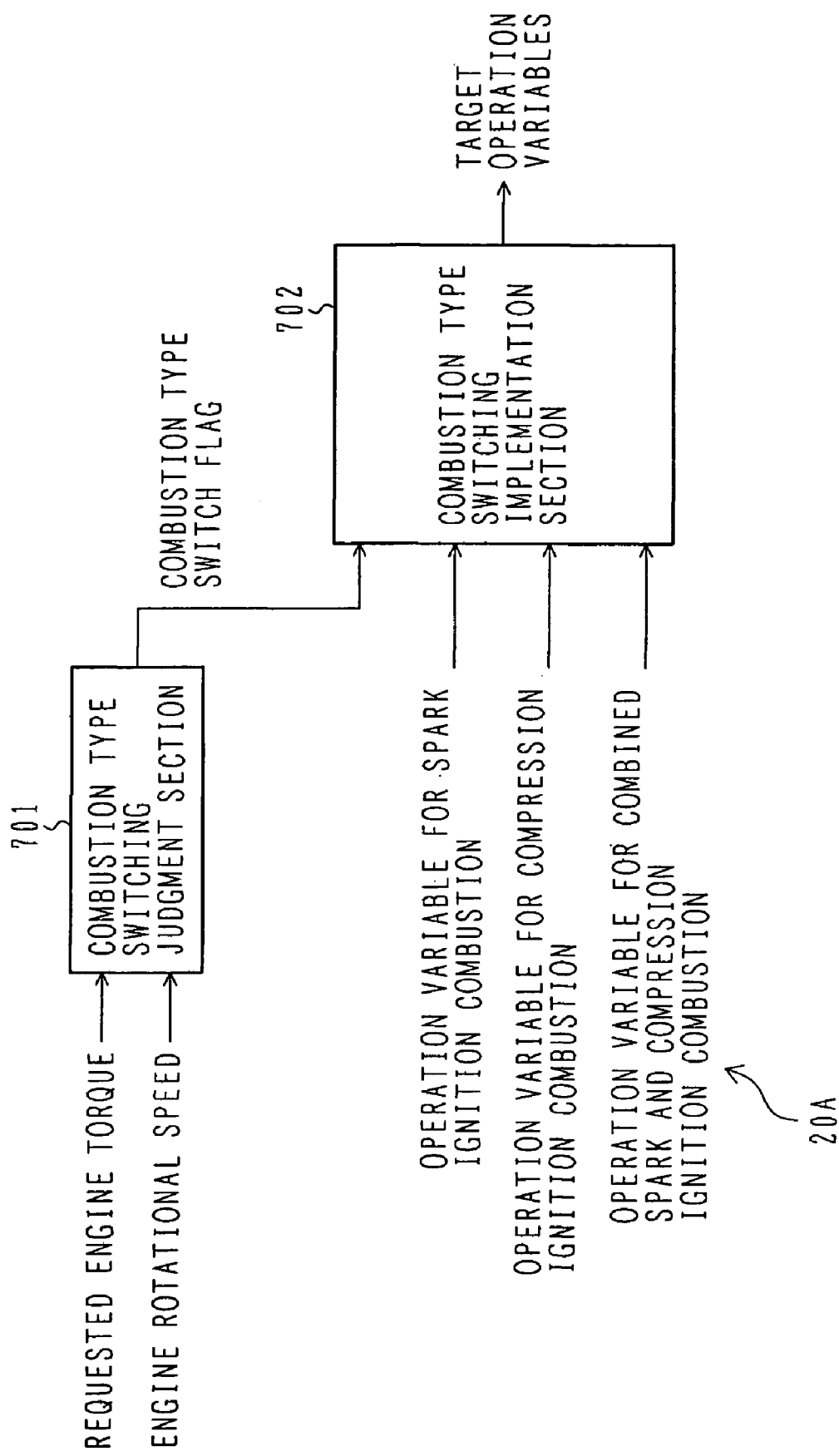
FIG. 7 is a control block diagram of a combustion type switching controller 20A of FIG. 2 according to an embodiment of the present invention.

FIG. 7 is a control block diagram of combustion type switching control by the combustion type switching controller 20A. The combustion type switching controller 20A includes a combustion type switching judgment section 701 and a combustion type switching implementation section 702 which changes operation variables of the engine 100 for combustion type switching.

The combustion type switching judgment section 701 determines whether or not combustion type switching is possible based on a requested engine torque and a rotational speed required for the engine 100, sets a combustion type switch flag, and outputs the flag to the combustion type switching implementation section 702. For example, the combustion type switching judgment section 701 includes a map showing operating conditions of the engine 100 based on an engine torque and an engine rotational speed as shown in FIG. 1. In an operating condition where compression ignition combustion is possible based on the operating condition map of FIG. 1 according to a requested engine torque and an engine rotational speed, the combustion type switching judgment section 701 determines that compression ignition combustion can be performed and then sets the combustion type switch flag to ON(=1). On the other hand, in an operating condition where compression ignition combustion is impossible, the combustion type switching judgment section 701 determines that it is necessary to perform spark ignition combustion and then sets the combustion type switch flag to OFF(=0).

The combustion type switching implementation section 702 determines target operation variables for controlling the engine 100 based on the combustion type switch flag which is an output of the combustion type switching judgment section 701. The target operation variables are selected from operation variables for spark ignition combustion, operation variables for compression ignition combustion, and operation variables for the combined combustion based on the combustion type switch flag. More specifically, if the combustion type switch flag is OFF(=0), the combustion type switching implementation section 702 sets operation variables for spark ignition combustion to target operation variables in order to perform spark ignition combustion. If the combustion type switch flag is ON(=1), the combustion type switching implementation section 702 sets operation variables for compression ignition combustion to target operation variables in order to perform compression ignition combustion. Further, if the combustion type switch flag changes from OFF(=0) to ON(=1) during execution of spark ignition combustion, the combustion type switching implementation section 702 sets operation variables for combined combustion to target operation variables to implement combined combustion and then sets operation variables for compression ignition combustion to target operation variables so as to change the combustion type from spark ignition combustion through combined combustion to compression ignition combustion. However, if the combustion type switch flag changes from ON(=1) to OFF(=0) during execution of combined combustion, the combustion type switching implementation section 702 sets operation variables for spark ignition combustion to target operation variables so as to perform spark ignition combustion without changing the combustion type to compression ignition combustion.

Further, if the combustion type switch flag changes from ON(=1) to OFF(=0) during execution of compression ignition combustion, the combustion type switching implementation section 702 sets operation variables for combined combustion to target operation variables to implement combined combustion and then sets operation variables for spark ignition combustion to target operation variables so as to change the combustion type from compression ignition combustion through combined combustion to spark ignition combustion. However, if the combustion type switch flag changes from OFF(=0) to ON(=1) during execution of combined combustion, the combustion type switching implementation section 702 sets operation variables for compression ignition combustion to target operation variables so as to perform compression ignition combustion without changing the combustion type to compression ignition combustion.

Here, the above-mentioned operation variables refer to an opening of the electronic control throttle 2 (a throttle opening), a fuel injection pulse width and fuel injection timing of the injector 3, an ignition timing of the ignition plug 4, an opening/closing timing of the intake valve 5a, and an opening/closing timing of the exhaust valve 5b, each being operated when controlling the engine 100.

Further, although an end timing of combined combustion at the time of combustion type switching is not shown in FIGS. 2 and 7, combined combustion is completed when combined combustion have been performed for a predetermined time based on the combined combustion detection flag which is an output result of combined combustion detection means, such as a cylinder internal pressure sensor for detecting a pressure in the cylinder 7, a knock sensor, etc. provided in the engine 100. When the combustion type is combined combustion, the combined combustion detection flag is set to ON(=1); otherwise, the flag is set to OFF(=0).

Figure 8:
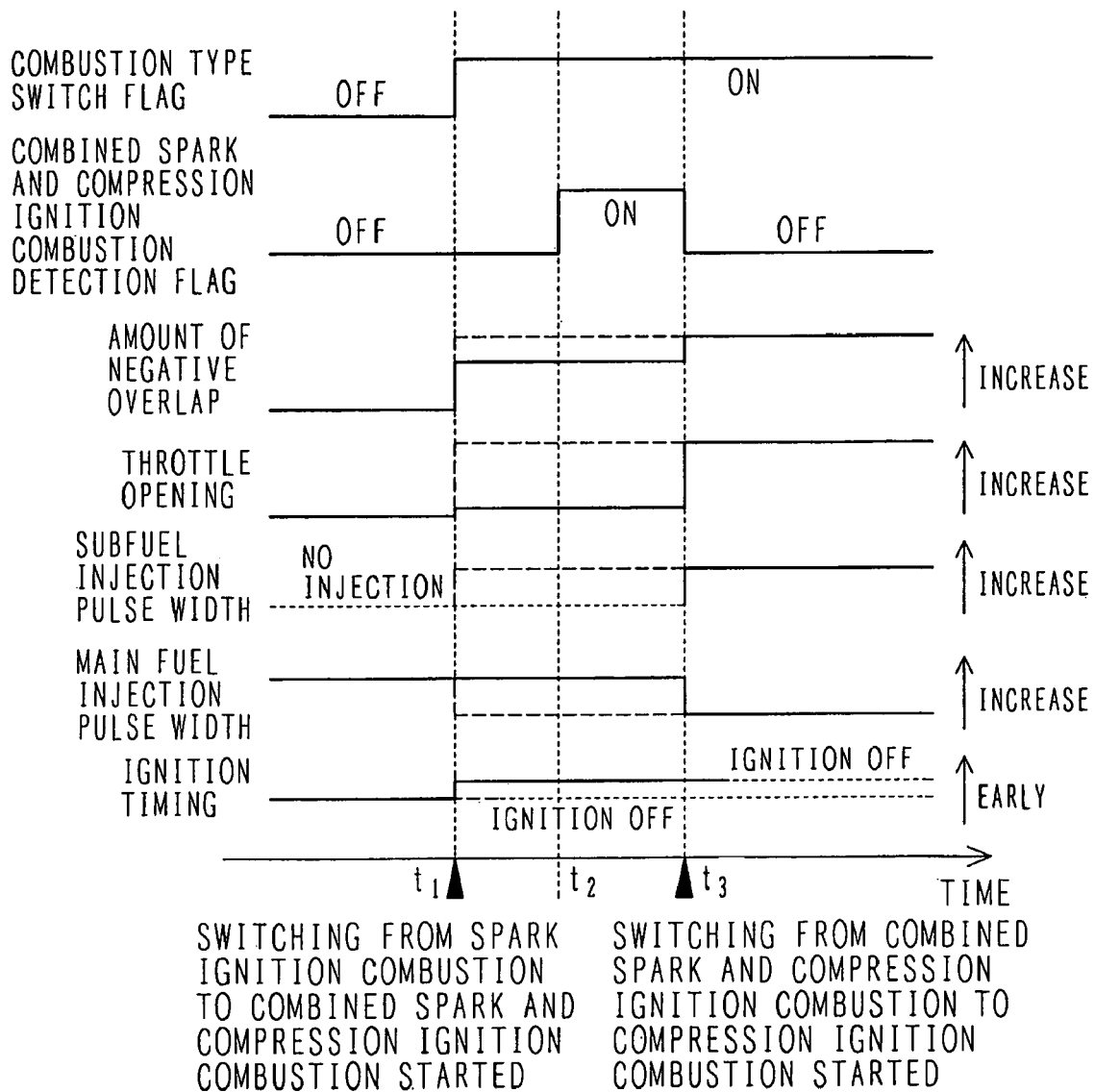
FIG. 8 is a time chart of each flag and variable when combustion type switching from spark ignition combustion to compression ignition combustion according to an embodiment of the present invention is performed, showing a combustion type switching flag, a combined combustion detection flag, an amount of negative overlap, a throttle opening, a subfuel injection pulse width, a main fuel injection pulse width, and an ignition signal.

An exemplary combustion type switching control from spark ignition combustion to compression ignition combustion by the combustion type switching controller 20A is shown below. FIG. 8 is a time chart of each flag and target value when combustion type switching control is implemented. The time chart shows the combustion type switch flag, the combined combustion detection flag, an amount of negative overlap, a throttle opening, a subfuel injection pulse width, a main fuel injection pulse width, and an ignition timing (For each of the combustion type switch flag and the combined combustion detection flag, the upward direction means the ON(=1) condition. For each of the negative overlap period, the throttle opening, the subfuel injection pulse width, and the main fuel injection pulse width, the upward direction means an increase in value. For the ignition timing, the upward direction means earlier timing.). Further, a dashed line shows a case where an operation variable is simply changed (simple switching control) at a time point t1 at the time of switching from spark ignition combustion to compression ignition combustion. A solid line shows a case where combustion type switching control according to the present embodiment is applied. The time point t1 denotes a timing at which combustion type switching from spark ignition combustion to combined combustion is started, a time point t2 denotes a timing at which combustion type switching from spark ignition combustion to combined combustion is completed, and a time point t3 denotes a timing at which combustion type switching from combined combustion to compression ignition combustion is started.

With the simple switching control, if the combustion type switch flag is set to ON(=1) at the time point t1, the controller increases the amount of negative overlap and the throttle opening, starts subfuel injection, and decreases the main fuel injection pulse width so as to perform compression ignition combustion. Then, after compression ignition combustion has been implemented, the controller sets the ignition timing to OFF.

On the other hand, when the combustion type switching control according to the present embodiment is applied, the controller changes the combustion type from spark ignition combustion to combined combustion at the time point t1. If the switch flag is set to ON(=1), the controller increases the amount of negative overlap and the throttle opening. However, the amount of negative overlap at the time of combined combustion is less than that at the time of compression ignition combustion. The throttle opening is operated so as to prevent a decrease in an air volume (by an increase in the amount of internal EGR by the increased amount of negative overlap) to maintain the air-fuel ratio to the stoichiometric condition. Further, also at the time point t1 and thereafter, the main fuel injection pulse width is the same as a setup value at the time of spark ignition combustion. However, the ignition timing is made earlier so as to restrain the degradation of combustion stability caused by the increased amount of internal EGR. At the time point t2, combined combustion is implemented by changing operation variables after the time point t1, and the combined combustion detection flag is set to ON(=1) from OFF(=0). From the time point t3 at which a predetermined time A have passed since the combined combustion detection flag was set to ON, the controller changes the combustion type from combined combustion to compression ignition combustion. For combustion type switching, the controller increases the amount of negative overlap and the throttle opening, starts subfuel injection, and decreases the main fuel injection pulse width. After compression ignition combustion has been implemented, the controller sets the ignition timing to OFF. In this case, the predetermined time A during which combined combustion is continued is a setup value predetermined in a test or a simulation. The predetermined time A may differ according to operating conditions of the engine 100 and may be determined based on an output result of a sensor which detects the combustion type in the cylinder 7. At the time point t3, compression ignition combustion is performed; therefore, the combined combustion detection flag changes from ON(=1) to OFF(=0).

Figure 9:
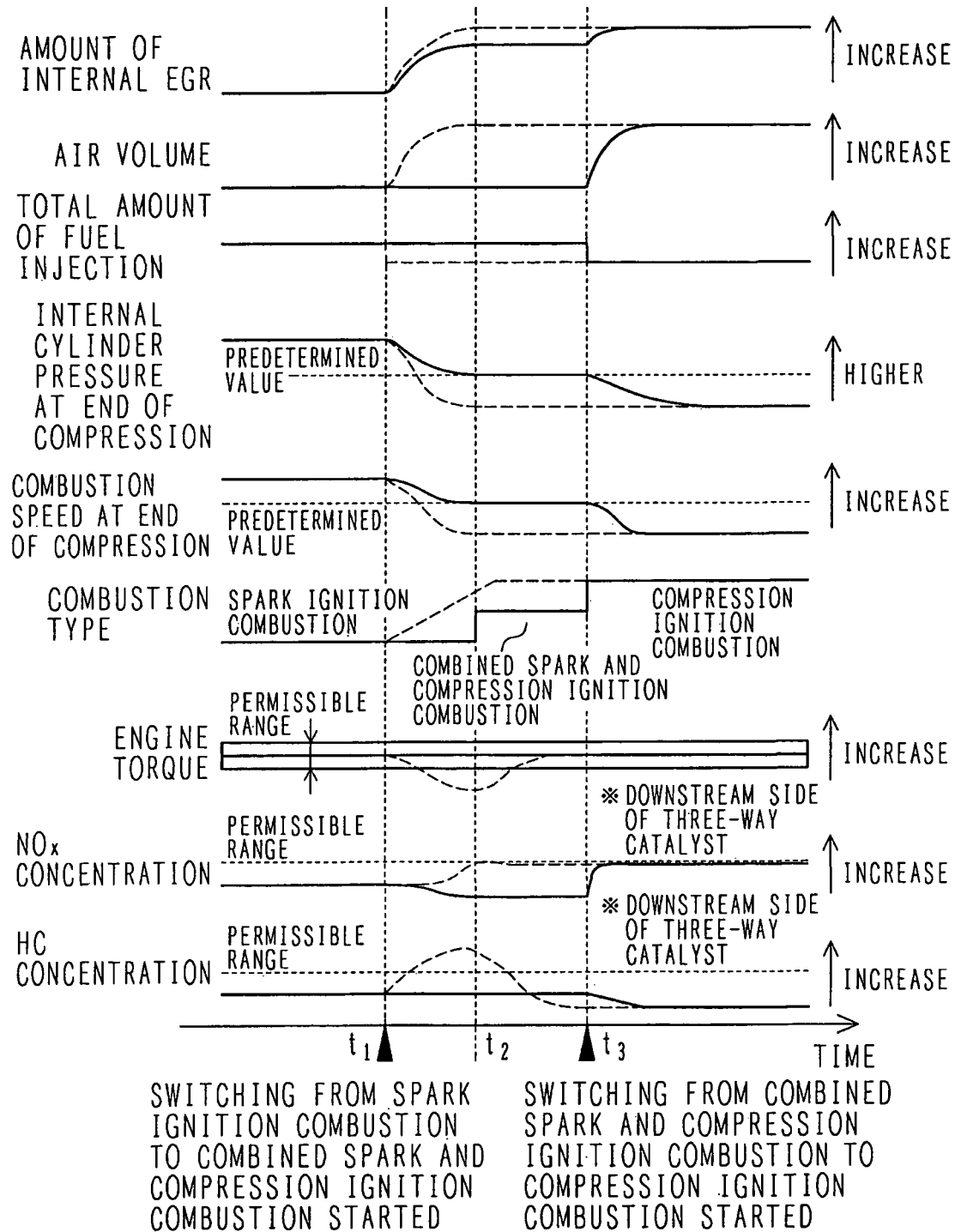
FIG. 9 is a time chart of each variable when combustion type switching from spark ignition combustion to compression ignition combustion according to an embodiment of the present invention is performed, showing an amount of internal EGR, an air volume, a total amount of fuel injection, an internal cylinder temperature at the end of compression, a combustion speed at the end of compression, a combustion type, an engine torque, an NOx concentration, and an HC concentration.

FIG. 9 is a time chart of each operation variable when combustion type switching control from spark ignition combustion to compression ignition combustion is performed by the combustion type switching controller 20A. The time chart shows the amount of internal EGR, the air volume, the total amount of fuel injection, the internal cylinder temperature at the end of compression, the combustion speed at the end of compression, the combustion type, the engine torque, the NOx concentration in exhaust gas components, and the HC concentration therein (For each of the internal EGR, the air volume, the total amount of fuel injection, the combustion speed at the end of compression, the engine torque, the NOx concentration, and the HC concentration, the upward direction means an increase in value. For the internal cylinder temperature at the end of compression, the upward direction means higher temperature. For the combustion type, the upward direction means compression ignition combustion.). In FIG. 9, a dashed line shows a case where the simple switching control is applied, and a solid line shows a case where the combustion type switching control according to the present embodiment is applied.

With the simple switching control, the controller changes each operation variable to setup values for implementing compression ignition combustion at the time point t1. Accordingly, the amount of internal EGR and the air volume increase, and the total amount of fuel injection decreases.

Thus, compression ignition combustion is implemented, and combustion is started after the end of compression (compression top dead center), thereby reducing the internal cylinder temperature at the end of compression and the combustion speed at the end of compression (The embodiment of FIG. 9 shows a case where the ignition timing of compression ignition combustion is after the end of compression.). However, when each operation variable is simply changed at the same timing, the engine undergoes a cycle with an unstable combustion condition in which neither spark ignition combustion nor compression ignition combustion can be implemented in the cylinder 7. This causes spark and combustion failures, and torque variation at the time of the combustion type switching exceeds a permissible range, resulting in degraded operation performance. In this time period during which torque fluctuations occur, the NOx concentration in exhaust gas components can be maintained equal to or lower than a permissible value, but the HC concentration therein exceeds a permissible value by spark failure, resulting in degraded exhaust performance.

In contrast to the above-mentioned simple switching control, when combustion type switching control from spark ignition combustion to compression ignition combustion is applied by the combustion type switching controller 20A at the time point t1, the controller increases the amount of internal EGR, but leaves the air volume unchanged by correcting the throttle opening. Further, since the total amount of fuel injection is also the same as that before the time point t1, the air-fuel ratio remains unchanged and is maintained to the stoichiometric condition. Further, the internal cylinder temperature at the end of compression decreases by an increase in the amount of internal EGR, and at the same time the combustion speed at the end of compression decreases. When each value is set as a predetermined value, the combustion type changes to combined combustion at the time point t2. Subsequently, the controller performs combined combustion for a predetermined time; then, it increases the amount of internal EGR and the air volume and decreases the total amount of fuel injection so as to change the combustion type to compression ignition combustion at the time t3. Then, compression ignition combustion is implemented. Accordingly, the internal cylinder temperature at the end of compression falls, and at the same time the combustion speed at the end of compression decreases (As mentioned above, FIG. 9 shows a case where the ignition timing at the time of compression ignition combustion is after the compression top dead center.). In the series of the above-mentioned combustion type switching processes, by smoothly changing the combustion type through the combined combustion, the combustion type can be changed from spark ignition combustion to compression ignition combustion while maintaining combustion stability. Since this can prevent spark and combustion failures at the time of combustion type switching, there are no fluctuations of the engine torque, and an increase in the NOx concentration and HC concentration can be restrained.

Further, if the combustion type switch flag (not shown in the diagram) changes from ON(=1) to OFF(=0) by a request from the driver, etc., during a time period between the time points t1 and t3 at the time of combustion type switching from spark ignition combustion to compression ignition combustion according to the present embodiment, the controller determines that it is necessary to change the combustion type to spark ignition combustion, and the combustion type switching implementation section 702 sets operation variables for spark ignition combustion to target operation variables so as to implement spark ignition combustion.

As a fuel control method mounted in the ECU 20, an air-precedent fuel control method is widely applied at the time of spark ignition combustion. With this method, the controller operates the electronic control throttle 2 which changes the air volume flowing into the cylinder according to a requested engine torque required for the engine and determines the amount of fuel injection so as to maintain the air-fuel ratio close to the stoichiometric condition according to the above-mentioned air volume measured by the airflow sensor 1. Further, a fuel-precedent fuel control method is applied at the time of compression ignition combustion. With this method, the amount of fuel injection is determined directly from a requested engine torque in order to perform combustion with the air-fuel ratio maintained to the lean-burn condition.

As the fuel control method according to the present invention, the air-precedent combustion control method (not shown in the diagram) is performed at the time of spark ignition combustion before the time point t1 shown in FIGS. 8 and 9, and then the fuel-precedent combustion control method is selected after the time point t1. The reason why this fuel control method is used is explained as follows: The air volume fluctuates by variation of the amount of EGR according to variation of valve timing. Then, if the air-precedent fuel control method is applied, the amount of fuel injection fluctuates at the time of combustion type switching to combined combustion or compression ignition combustion after the time point t1, resulting in torque fluctuations. Thus, the above-mentioned fuel control method aims at suppressing the torque fluctuations. As another type of fuel control, the air-precedent fuel control method may be performed in combined combustion performed between the time points t1 and t3; then, the fuel-precedent fuel control method may be selected at the time point t3.

Figure 10:
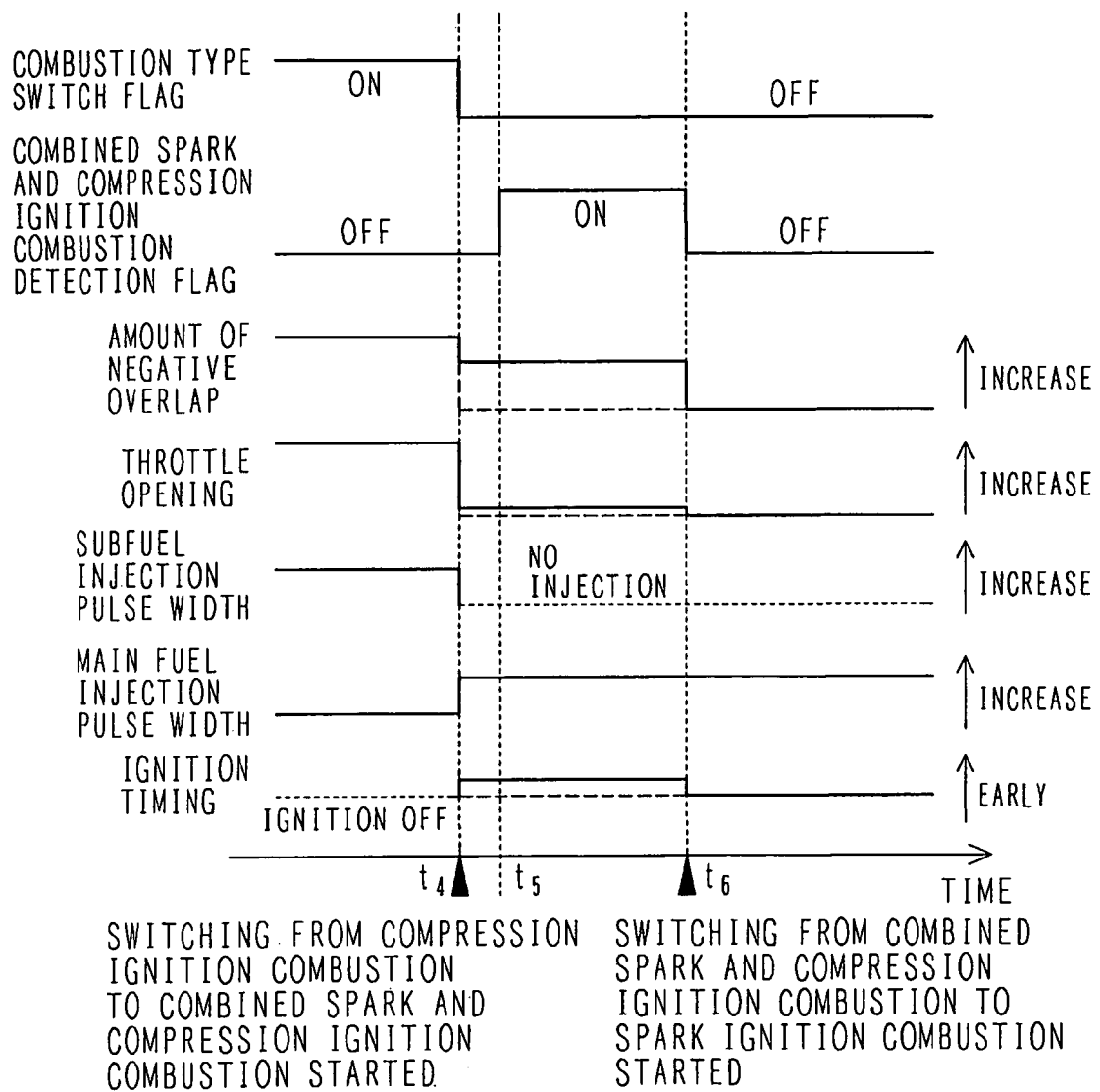
FIG. 10 is a time chart of each flag and variable when combustion type switching from compression ignition combustion to spark ignition combustion according to an embodiment of the present invention is performed, showing a combustion type switching flag, a combined combustion detection flag, an amount of negative overlap, a throttle opening, a subfuel injection pulse width, a main fuel injection pulse width, and an ignition signal.

Combustion type switching control from compression ignition combustion to spark ignition combustion by the combustion type switching controller 20A will be explained below. FIG. 10 is a time chart of each flag and target value when the above-mentioned combustion type switching control is performed. The time chart shows the combustion type switch flag, the combined combustion detection flag, the amount of negative overlap, the throttle opening, the subfuel injection pulse width, the main fuel injection pulse width, and ignition timing (For each of the combustion type switch flag and the combined combustion detection flag, the upward direction means the ON(=1) condition. For each of the negative overlap period, the throttle opening, the subfuel injection pulse width, and the main fuel injection pulse width, the upward direction means an increase in value. For the ignition timing, the upward direction means earlier timing.). Further, a dashed line shows a case where target values of each operation variable is simply changed (simple switching control) at a time point t4 at the time of switching from compression ignition combustion to spark ignition combustion. A solid line shows a case where the combustion type switching control according to the present embodiment is applied. The time point t4 denotes a timing at which combustion type switching from compression ignition combustion to combined combustion is started, a time point t5 denotes a timing at which combustion type switching from compression ignition combustion to combined combustion is completed, and a time point t6 denotes a timing at which combustion type switching from combined combustion to spark ignition combustion is started.

With the simple switching control, the controller decreases the amount of negative overlap and the throttle opening, stops subfuel injection, increases the main fuel injection pulse width, and then sets the ignition timing to ON so as to perform spark ignition combustion at the same time as when the combustion type switch flag is set to OFF(=0) at the time point t4.

On the other hand, when the combustion type switching control according to the present embodiment is applied, the controller decreases the amount of negative overlap and the throttle opening so as to perform combustion type switching from compression ignition combustion to combined combustion at the time point t4. However, the controller operates the amount of negative overlap at the time of combined combustion such that it is less than that at the time of compression ignition combustion and the throttle opening to such an extent that a deviation from the stoichiometric condition can be avoided by decreasing the air volume when the internal EGR is introduced. Further, at the time of combined combustion, in order to perform the same fuel injection as that at the time of spark ignition combustion, the controller zeros the subfuel injection pulse width, stops subfuel injection, and increases the main fuel injection pulse width at the time point t4. Further, the controller sets the ignition signal to ON at the time point t4, i.e., the controller sets an ignition timing which is earlier than that at the time of spark ignition combustion in order to ensure combustion stability at the time of combined combustion. With operation variables changed after the time point t4, combined combustion is performed, and the combined combustion detection flag is set to ON(=1) from OFF (=0) at the time point t5. At the time point t6 at which a predetermined time B have passed since the combined combustion was started at the time point t5, the controller decreases the amount of negative overlap and the throttle opening and delays the ignition timing so as to switch the combustion type from combined combustion to spark ignition combustion. In this case, the predetermined time B during which combined combustion is continued is a setup value predetermined in a test or a simulation. The predetermined time B may differ according to operating conditions of the engine 100 and may be determined based on an output result of a sensor that detects the combustion type in the cylinder 7. At the time point t6, compression ignition combustion is performed; therefore, the combined combustion detection flag changes from ON(=1) to OFF(=0).

Figure 11:
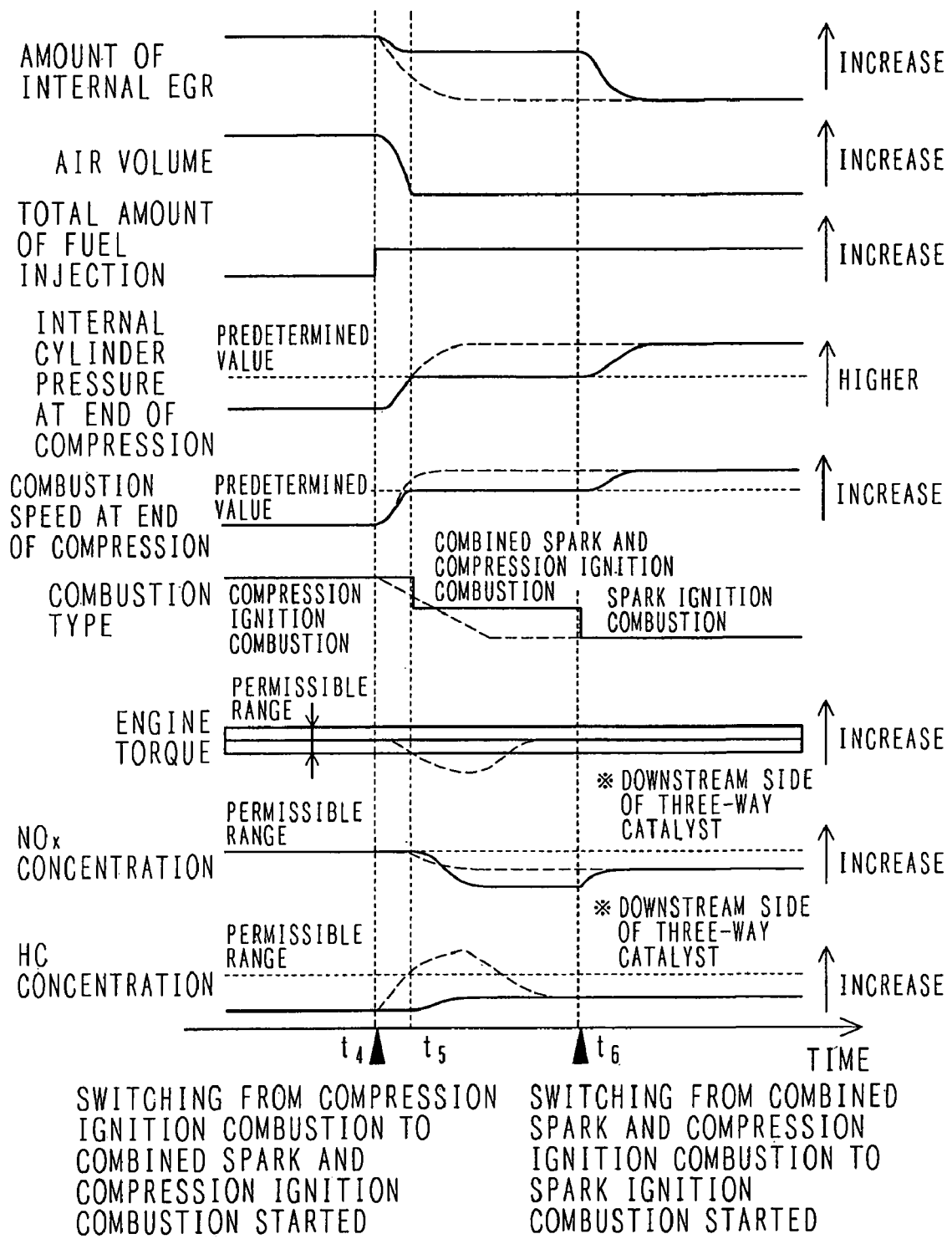
FIG. 11 is a time chart of each variable when combustion type switching from compression ignition combustion to spark ignition combustion according to an embodiment of the present invention is performed, showing an amount of internal EGR, an air volume, a total amount of fuel injection, an internal cylinder temperature at the end of compression, a combustion speed at the end of compression, a combustion type, an engine torque, an NOx concentration, and an HC concentration.

FIG. 11 is a time chart of each value when combustion type switching control from compression ignition combustion to spark ignition combustion by the combustion type switching controller 20A is performed. The time chart shows the amount of internal EGR, the air volume, the total amount of fuel injection, the internal cylinder temperature at the end of compression, the combustion speed at the end of compression, the combustion type, the engine torque, the NOx concentration in exhaust gas components, and the HC concentration therein (For each of the internal EGR, the air volume, the total amount of fuel injection, the combustion speed at the end of compression, the engine torque, the NOx concentration, and the HC concentration, the upward direction means an increase in value. For the internal cylinder temperature at the end of compression, the upward direction means higher temperature. For the combustion type, the upward direction means compression ignition combustion.). In FIG. 11, a dashed line shows a case where the simple switching control is applied, and a solid line shows a case where the combustion type switching control according to the present embodiment is applied.

With the simple switching control, the controller changes each operation variable to setup values for implementing spark ignition combustion at the time point t4. Accordingly, the amount of internal EGR, the air volume, and the total amount of fuel injection decrease. Thus, when spark ignition combustion is implemented, i.e., the combustion type is changed to spark ignition combustion in which combustion is started by ignition sparks supplied from the ignition plug before the end of compression, the internal cylinder temperature at the end of compression rises, and the combustion speed at the end of compression increases (However, the embodiment of FIG. 11 shows a case where the ignition timing of compression ignition combustion is after the end of compression.). However, when the combustion type is simply changed at the same timing as operation variables, the engine undergoes a cycle with an unstable combustion condition in which neither compression ignition combustion nor spark ignition combustion can be implemented in the cylinder 7. This causes spark and combustion failures, and torque variation at the time of the combustion type switching exceeds a permissible range, resulting in degraded operation performance. In this time period during which torque fluctuations occur, the NOx concentration in exhaust gas components can be maintained equal to or lower than a permissible value, but the HC concentration therein exceeds a permissible value by spark failure, resulting in degraded exhaust performance.

In contrast to the above-mentioned simple switching control, when the combustion type switching control from compression ignition combustion to spark ignition combustion by the combustion type switching controller 20A is applied, the amount of internal EGR is decreased so as to change the combustion type from compression ignition combustion to combined combustion at the time point t4. However, the air volume remains unchanged through the correction of the throttle opening; therefore, the air-fuel ratio is maintained to the stoichiometric condition. Further, in order to obtain a total amount of fuel injection equivalent to that at the time of spark ignition combustion with comparatively low thermal efficiency, the controller increases the total amount of fuel injection. Further, when combined combustion by spark ignition is started, the internal cylinder temperature at the end of compression rises, and at the same time the combustion speed at the end of compression increases. Then, when each value is set as predetermined values, the combustion type changes to combined combustion at the time point t5. Subsequently, the controller performs combined combustion for a predetermined time; then, it decreases the amount of internal EGR, delays the ignition timing, and performs spark ignition combustion so as to change the combustion type to spark ignition combustion at the time point t6. Accordingly, the internal cylinder temperature at the end of compression increases by the decreased amount of internal EGR, and at the same time the combustion speed at the end of compression increases (As mentioned above, FIG. 11 shows a case where the ignition timing at the time of compression ignition combustion is after the compression top dead center.). In the series of the above-mentioned combustion type switching processes, by smoothly changing the combustion type through combined combustion, the combustion type can be changed from compression ignition combustion to spark ignition combustion while maintaining combustion stability. This makes it possible to prevent spark and combustion failures at the time of combustion type switching; therefore, there are no fluctuations of engine torque, and an increase in the NOx concentration and HC concentration can be restrained.

Further, if the combustion type switch flag (not shown in the diagram) changes from OFF(=0) to ON(=1) by a request from a driver, etc., during a time period between the time points t4 and t6 upon combustion type switching from compression ignition combustion to spark ignition combustion according to the present embodiment, the controller determines that it is necessary to change the combustion type to compression ignition combustion, and the combustion type switching implementation section 702 sets operation variables for compression ignition combustion to target operation variables so as to implement compression ignition combustion.

As the fuel control method according to the present invention, for the purpose of suppressing torque fluctuations accompanying air volume fluctuations as mentioned above, the fuel-precedent combustion control method (not shown in the diagram) is performed at the time of combined combustion and compression ignition combustion before the time point t6 shown in FIGS. 10 and 11, and the air-precedent combustion control method is selected after the time point t6. Further, as another type of fuel control, the fuel-precedent fuel control method may be performed before the time point t5; then, the air-precedent fuel control method may be performed at the time of combined combustion and compression ignition combustion after the time point t5.

Figure 12:
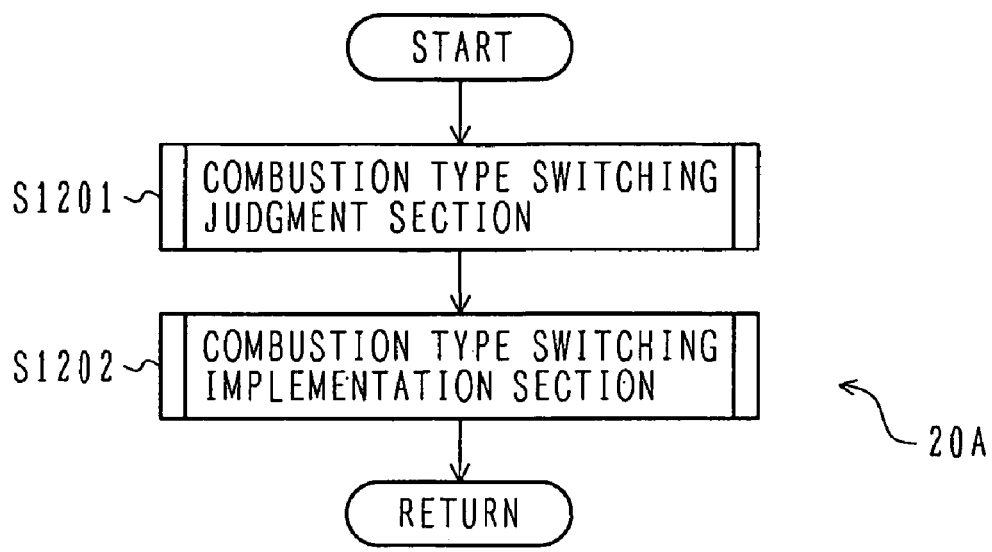
FIG. 12 is a flow chart of the combustion type switching controller 20A of FIG. 2 according to an embodiment of the present invention.
Figure 13:
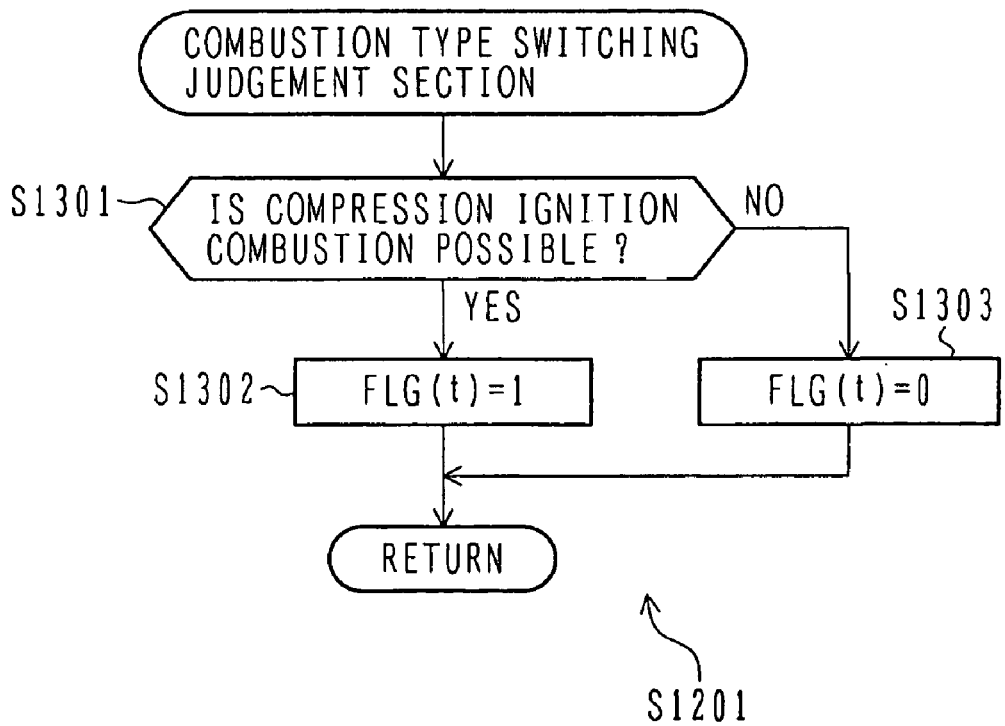
FIG. 13 is a flow chart of a combustion type switching judgment section of FIG. 12 according to an embodiment of the present invention.
Figure 14:
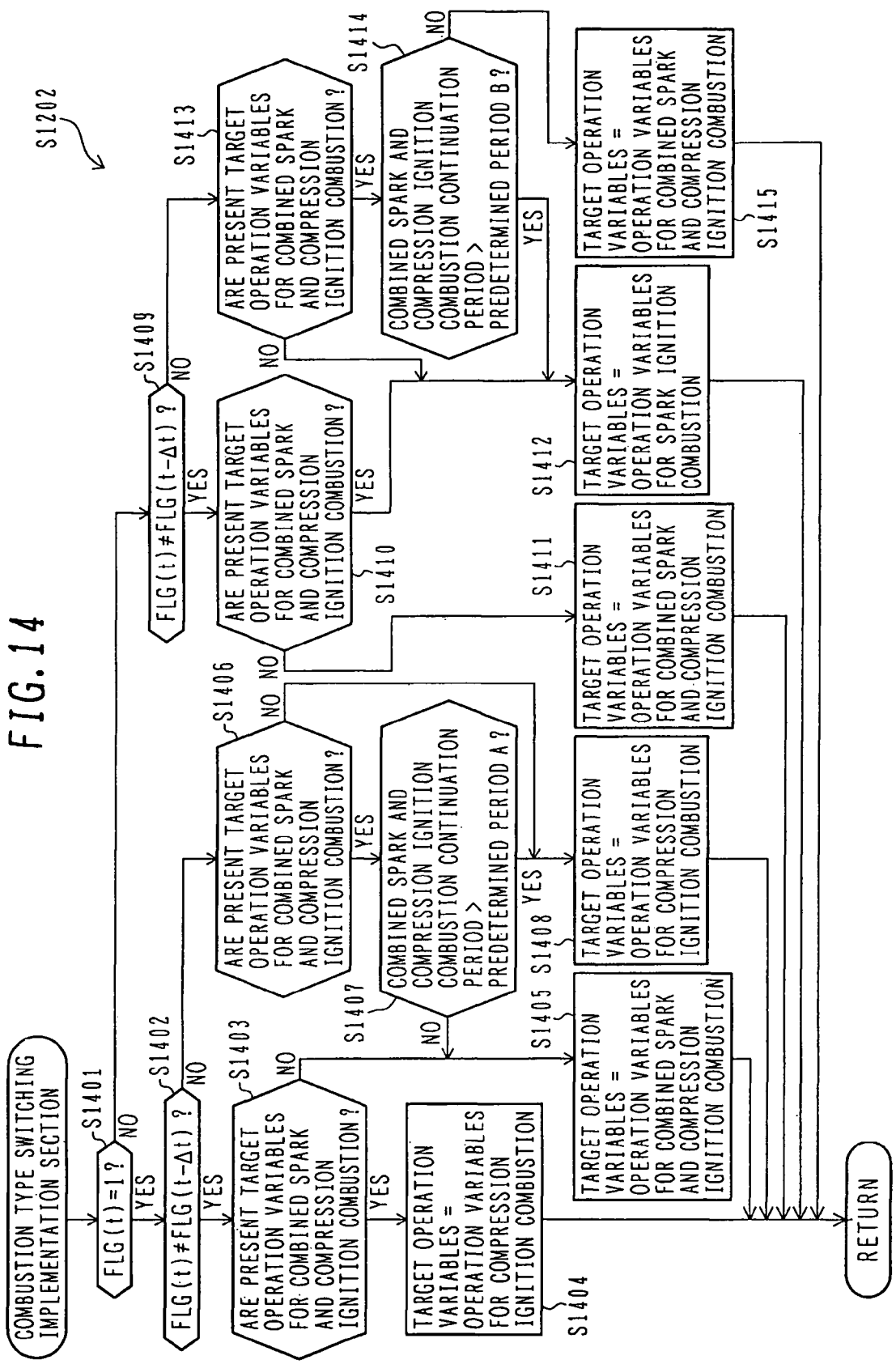
FIG. 14 is a flow chart of a combustion type switching implementation section of FIG. 12 according to an embodiment of the present invention.

FIGS. 12 to 14 are flow charts of combustion type switching control by the combustion type switching controller 20A. FIG. 12 is a flow chart showing the control block of FIG. 7. In Step S1201, the combustion type switching controller 20A determines which of spark ignition combustion and compression ignition combustion is more suitable for the present operating conditions and then sets the combustion type switch flag FLG(t) to OFF(=0) or ON(=1), where a variable t denotes time. Further, in Step S1202, the combustion type switching controller 20A sets operation variables suitable for the selected combustion type and at the same time changes the operation variables for combustion type switching while restraining the degradation of operation performance and exhaust performance so as to perform combustion of a type according to the combustion type switch flag FLG(t) which denotes a result of Step S1201.

FIG. 13 is a flow chart of the combustion type switching judgment section in Step S1201. In Step S1301, the combustion type switching judgment section determines a feasible combustion type based on the map of FIG. 1 according to operating conditions determined by a requested torque and an engine rotational speed. If the operating conditions are such that spark ignition combustion should be performed, the combustion type switching judgment section proceeds to Step S1302; if the operating conditions are such that compression ignition combustion can be performed, the same section proceeds to Step S1303. In Step S1302, the combustion type switching judgment section sets the combustion type switch flag FLG(t) to ON(=1) and then terminates a series of the operations so as to perform compression ignition combustion. Further, in Step S1303, the combustion type switching judgment section sets the combustion type switch flag FLG(t) to OFF(=0) and then terminates a series of the operations so as to perform spark ignition combustion.

FIG. 14 is a flow chart of a combustion type switching implementation section S1202. In Step S1401, the combustion type switching implementation section determines whether or not the combustion type switch flag FLG(t) set in Step S1201 is ON(=1). If FLG(t) is 1, i.e., in a case of switching to or continuing compression ignition combustion, the combustion type switching implementation section proceeds to Step S1402; if it is FLG(t) is 0, i.e., in a case of switching to or continuing spark ignition combustion, the same section proceeds to Step S1409.

First, a flow chart from Step S1402 forward will be explained below. Step S1402 determines whether or not FLG(t) has changed at the present time t, i.e., whether or not FLG(t) has changed to FLG(t)=1 from a previous condition FLG(t−Δt) at a time point earlier than the present time t by a control cycle Δt. If FLG(t−Δt)=0 has changed to FLG(t)=1, the combustion type switching implementation section proceeds to Step S1403 so as to change the combustion type from spark ignition combustion to compression ignition combustion or from combined combustion to compression ignition combustion. Further, if both FLG(t−Δt) and FLG(t) are 1, the combustion type switching implementation section proceeds to Step S1406 so as to continue combined combustion at the time of combustion type switching, change the combustion type from combined combustion to compression ignition combustion, or continue compression ignition combustion.

Step S1403 determines whether or not operation variables for combined combustion are set as present target operation variables, i.e., whether or not combined combustion is currently being performed or operation variables are currently being operated so as to perform combined combustion. If the present combustion type is combined combustion, the combustion type switching implementation section determines that execution of compression ignition combustion is requested during a combined combustion continuation period and then proceeds to Step S1404. If the present combustion type is not of combined combustion but of spark ignition combustion, the combustion type switching implementation section determines that combustion type switching from spark ignition combustion to compression ignition combustion is requested and then proceeds to Step S1405.

In Step S1404, the combustion type switching implementation section sets operation variables for compression ignition combustion to target operation variables and then terminates a series of the operations so as to perform compression ignition combustion. In Step S1405, the combustion type switching implementation section sets operation variables for combined combustion to target operation variables and then terminates a series of the operations so as to perform combined combustion during the process of switching from spark ignition combustion to compression ignition combustion.

Step S1406, which is executed when a condition of FLG(t)=1 continues, determines whether or not operation variables for combined combustion are set as present target operation variables, i.e., whether or not combined combustion is currently being performed, or operation variables are currently being operated so as to perform combined combustion. If the combustion type switching implementation section determines that the present target operation variables are those for combined combustion, the same section proceeds to Step S1407. On the other hand, if the present target operation variables are not operation variables for combined combustion, i.e., if combustion type switching is completed, operation variables for compression ignition combustion are set, and compression ignition combustion is currently being continued, the combustion type switching implementation section proceeds to Step S1408.

Step S1407 determines whether or not the combined combustion continuation period (a time period during which the combined combustion detection flag is ON(=1)) is longer than a predetermined time A, i.e., whether or not combustion type switching is completed and whether it is necessary to set operation variables for compression ignition combustion to target operation variables. If the combined combustion continuation period is longer than the predetermined time A, the combustion type switching implementation section proceeds to Step S1408. On the other hand, if the combined combustion continuation period is equal to or shorter than the predetermined time A, the combustion type switching implementation section proceeds to Step S1405 to set operation variables for combined combustion to target operation variables, terminates a series of the operations, and then continues combined combustion.

In Step S1408, the combustion type switching implementation section sets operation variables for compression ignition combustion to target operation variables and then terminates a series of the operations so as to continue compression ignition combustion or change the combustion type from combined combustion to compression ignition combustion.

A flow chart from Step S1409 forward will be explained below. Step S1409 determines whether or not the combustion type switch flag FLG(t) has changed from a previous condition FLG(t−Δt) at a time point earlier than the present time t by a time period Δt. If FLG(t−Δt)=1 has changed to FLG(t)=0, the combustion type switching implementation section determines that it is necessary to change the combustion type from compression ignition combustion to spark ignition combustion or from combined combustion to spark ignition combustion during the process of combustion type switching to compression ignition combustion and then proceeds to Step S1410. If FLG(Δt)=0 continues, i.e., if the combustion type switching implementation section determines that it is necessary to continue combined combustion, change the combustion type from combined combustion to spark ignition combustion, or continue spark ignition combustion, the same section proceeds to Step S1413.

Step S1410 determines whether or not the present target operation variables are operation variables for combined combustion. If operation variables for combined combustion are set as present target operation variables, the combustion type switching implementation section proceeds to Step S1412; otherwise, i.e., if operation variables for compression ignition combustion are set, the same section proceeds to Step S1411.

Step S1411, which is executed when changing the combustion type to compression ignition combustion, sets operation variables for spark ignition combustion to target operation variables and then terminates a series of the operations so as to change the combustion type from compression ignition combustion to spark ignition combustion. Step S1412 is executed when combustion type switching to spark ignition combustion is requested during the combined combustion continuation period in the process of combustion type switching to compression ignition combustion. This step sets operation variables for spark ignition combustion to target operation variables and then terminates a series of the operations so as to change the combustion type from combined combustion to spark ignition combustion.

Step S1413 determines whether or not combined combustion is currently being continued during the process of combustion type switching to spark ignition combustion. If operation variables for combined combustion are set as present target operation variable, i.e., combined combustion is currently being continued, the combustion type switching implementation section proceeds to Step S1414. On the other hand, if operation variables for combined combustion are not set as present target operation variable, i.e., if operation variables for spark ignition combustion are set, the combustion type switching implementation section determines that continuation of spark ignition combustion is requested, proceeds to Step S1412 to set operation variables for spark ignition combustion to target operation variables, and then terminates a series of the operations.

Step S1414 determines whether or not the combined combustion continuation period (a time period during which the combined combustion detection flag is ON(=1)) during the process of combustion type switching from compression ignition combustion to spark ignition combustion is longer than a predetermined time B. If the combined combustion continuation period is longer than the predetermined time B, the combustion type switching implementation section determines that switching from combined combustion to spark ignition combustion is requested, proceeds to Step S1412 to set operation variables for spark ignition combustion to target operation variables, and then terminates a series of the operations. On the other hand, if the combined combustion continuation period is equal to or shorter than the predetermined time B, the combustion type switching implementation section proceeds to Step S1415 so as to continue combined combustion before switching to spark ignition combustion.

In Step S1415, the combustion type switching implementation section sets operation variables for combined combustion to target operation variables and then terminates a series of the operations so as to continue combined combustion.

The predetermined time A in the above-mentioned flow chart refers to a time period during which combined combustion is continued during the process of switching from spark ignition combustion to compression ignition combustion, and it is equivalent to a time period between t3 and t1 (t3-t1) of FIGS. 8 and 9. Likewise, the predetermined time B is a time period during which combined combustion is continued during the process of switching from compression ignition combustion to spark ignition combustion, and it is equivalent to a time period between t6 and t4 (t6-t4) of FIGS. 10 and 11.

Although an embodiment of the present invention has been explained in detail above, the present invention is not limited thereto, but may be modified in diverse ways in design without departing from the spirit thereof described in the appended claims.

For example, the combustion type switching judgment section 701 may determine whether or not switching between spark ignition combustion and compression ignition combustion can be performed based not only on a requested torque and an engine rotational speed but also on at least one of output signals of sensors which directly or indirectly detect a water temperature, an exhaust temperature, an intake temperature, and a fuel temperature.

Further, although the present embodiment uses combustion control means based on control of the internal EGR to perform compression ignition combustion, it may be possible to use combustion control means based on adjustment of EGR, such as external EGR, or control of an intake temperature, an actual compression ratio, or an intake pipe pressure. In this case, parameters at the time of combustion type switching are set to predetermined values that enable combined combustion to change the combustion type. Further, although the predetermined values can be changed based not only on operating conditions but also on a water temperature, an exhaust temperature, an intake temperature, and a fuel temperature, it is possible to use values predetermined through a simulation or an experiment. Further, it is also possible to update the predetermined values through learning during operation.

With the engine 100 which operates by switching the combustion type between compression ignition combustion and spark ignition combustion, the combustion type can smoothly be changed by providing combined combustion in the process of combustion type switching, making it possible to restrain the degradation of operation performance at the time of combustion type switching. Further, since the air-fuel ratio is maintained to the stoichiometric condition in combined combustion, it is also possible to restrain the degradation of exhaust performance at the time of combustion type switching.

What is claimed is:

1. A controller which controls an internal combustion engine:
wherein the internal combustion engine comprises:
an injector which injects fuel into a combustion chamber;
an ignition plug for igniting the fuel injected into the combustion chamber;
an intake valve that can control actuation timing; the intake valve being provided on the intake side of a cylinder which forms a part of the combustion chamber; and
an exhaust valve that can control actuation timing; the exhaust valve being provided on the exhaust side of the cylinder;
wherein the controller comprises:
a throttle drive circuit for driving a throttle;
an injector drive circuit for driving the injector;
a valve drive circuit for driving the intake valve and the exhaust valve;
an ignition output circuit which outputs an ignition signal to the ignition apparatus; and
control circuit which controls the internal combustion engine by controlling at least one of the injector drive circuit, the valve drive circuit, the ignition output circuit, and the throttle drive circuit based on inputted information about operating conditions of the internal combustion engine;
wherein the control circuit includes:
a first operation mode for controlling at least one of the injector drive circuit, the valve drive circuit, the ignition output circuit, and the throttle drive circuit so as to ignite and combust fuel injected from the injector by the ignition apparatus to actuate the internal combustion engine;
a second operation mode for controlling at least one of the injector drive circuit, the valve drive circuit, the ignition output circuit, and the throttle drive circuit so as to combust fuel injected from the injector by a pressure rise in the cylinder to actuate the internal combustion engine; and
a third operation mode for controlling at least one of the injector drive circuit, the valve drive circuit, the ignition output circuit, and the throttle drive circuit so as to ignite fuel injected from the injector by the ignition apparatus to combust a part of the fuel and at the same time ignite and combust the remaining fuel by a pressure rise in the cylinder after combustion; and
wherein the control circuit selects the first, second, or third operation mode according to information about operating conditions of the internal combustion engine, and wherein:
when the third operation mode is performed, the variable valve drive circuit is controlled such that the amount of negative overlap becomes larger than that in the first operation mode and smaller than that in the second operation mode;
the throttle drive circuit is controlled such that a throttle opening becomes larger than that in the first operation mode and smaller than that in the second operation mode; and
the ignition output circuit is controlled such that ignition is performed earlier than an ignition timing of the first operation mode.

2. A controller which controls an internal combustion engine:
wherein the internal combustion engine comprises:
an injector which injects fuel into a combustion chamber;
an ignition plug for igniting the fuel injected into the combustion chamber;
an intake valve that can control actuation timing; the intake valve being provided on the intake side of a cylinder which forms a part of the combustion chamber; and
an exhaust valve that can control actuation timing; the exhaust valve being provided on the exhaust side of the cylinder;
wherein the controller comprises:
a throttle drive circuit for driving a throttle;
an injector drive circuit for driving the injector;
a valve drive circuit for driving the intake valve and the exhaust valve;
an ignition output circuit which outputs an ignition signal to the ignition apparatus; and
a control circuit which controls the internal combustion engine by controlling at least one of the injector drive circuit, the valve drive circuit, the ignition output circuit, and the throttle drive circuit based on inputted information about operating conditions of the internal combustion engine;
wherein the control circuit includes:
a first operation mode for controlling at least one of the injector drive circuit, the valve drive circuit, the ignition output circuit, and the throttle drive circuit so as to ignite and combust fuel charged in the combustion chamber by the ignition apparatus to actuate the internal combustion engine based on inputted information about operating conditions of the internal combustion engine; and
a second operation mode for controlling at least one of the injector drive circuit, the valve drive circuit, the ignition output circuit, and the throttle drive circuit so as to combust fuel charged in the cylinder by a pressure rise in the cylinder to actuate the internal combustion engine based on the same information; and
wherein, upon switching between the first and second operation modes,
the variable valve drive circuit is controlled such that the amount of negative overlap becomes larger than that in the first operation mode and smaller than that in the second operation mode;
the throttle drive circuit is controlled such that a throttle opening becomes larger than that in the first operation mode and smaller than that in the second operation mode; and
the ignition output circuit is controlled such that ignition is performed earlier than an ignition timing of the first operation mode.

3. A controller of an internal combustion engine that performs combined combustion in which ignition combustion is performed by a pressure rise after spark ignition combustion, wherein:
control is performed such that the air-fuel ratio can be maintained to the stoichiometric condition during an execution time period of the combined combustion.

4. The controller according to claim 3, wherein:
spark ignition combustion and compression ignition combustion are performed, and the combined combustion is performed in the process of combustion type switching between the spark ignition combustion and the compression ignition combustion.

5. The controller according to claim 4, comprising:
determination means for determining whether or not switching between the spark ignition combustion and the ignition combustion is possible.

6. The controller according to claim 5, wherein:
the determination means determines combustion type switching based on at least one of signals of sensors which directly or indirectly detect an engine rotational speed, a requested torque, a water temperature, an intake temperature, an exhaust gas temperature, or a combustion temperature of the internal combustion engine.

7. The controller according to claim 4, wherein:

fuel control means is changed from air-precedent fuel control means for determining an amount of fuel supplied to the combustion chamber based on an air volume flowing into the combustion chamber adjusted by a throttle opening to fuel-precedent fuel control means for determining the amount of fuel based on a requested torque, during execution of the spark ignition combustion; then, the combustion type is changed from the spark ignition combustion to the combined combustion.

8. The controller according to claim 4, wherein:

fuel control means is changed from air-precedent fuel control means for determining an amount of fuel supplied to the combustion chamber based on an air volume flowing into the combustion chamber adjusted by a throttle opening to fuel-precedent fuel control means for determining the amount of fuel based on a requested torque, during execution of the combined combustion; then, the combustion type is changed from the combined combustion to the compression ignition combustion.

9. The controller according to claim 4, wherein:

the combustion type is changed from the compression ignition combustion to the combined combustion; then, fuel control means is changed from fuel-precedent fuel control means for determining an amount of fuel supplied to the combustion chamber based on a requested torque to air-precedent fuel control means for determining the amount of fuel based on an air volume flowing into the combustion chamber adjusted by a throttle opening.

10. The controller according to claim 4, wherein:

the combustion type is changed from the combined combustion to the spark ignition combustion; then, fuel control means is changed from fuel-precedent fuel control means for determining an amount of fuel supplied to the combustion chamber based on a requested torque to air-precedent fuel control means for determining the amount of fuel based on an air volume flowing into the combustion chamber adjusted by a throttle opening.

* * * * *